(12) United States Patent
Zuluaga et al.

(10) Patent No.: US 11,367,022 B2
(45) Date of Patent: Jun. 21, 2022

(54) SYSTEM AND METHOD FOR EVALUATING AND DEPLOYING UNSUPERVISED OR SEMI-SUPERVISED MACHINE LEARNING MODELS

(71) Applicant: AMADEUS S.A.S., Biot (FR)

(72) Inventors: Maria Zuluaga, Antibes (FR); David Renaudie, Valbonne (FR); Rodrigo Acuna Agost, Golfe Juan (FR)

(73) Assignee: Amadeus S.A.S., Biot (FR)

( * ) Notice: Subject to any disclaimer, the term of this patent is extended or adjusted under 35 U.S.C. 154(b) by 661 days.

(21) Appl. No.: 16/431,228

(22) Filed: Jun. 4, 2019

(65) Prior Publication Data
US 2019/0392351 A1      Dec. 26, 2019

(30) Foreign Application Priority Data
Jun. 22, 2018 (FR) ...................................... 1855567

(51) Int. Cl.
*G06N 20/20* (2019.01)
*G06F 11/34* (2006.01)
*G06F 17/18* (2006.01)

(52) U.S. Cl.
CPC ......... *G06N 20/20* (2019.01); *G06F 11/3428* (2013.01); *G06F 17/18* (2013.01)

(58) Field of Classification Search
CPC .... G06F 11/3428; G06F 17/18; G06F 21/552; G06N 20/10; G06N 20/20; G06N 3/0454; G06N 5/003; G06N 7/005
(Continued)

(56) References Cited

U.S. PATENT DOCUMENTS

| | | | |
|---|---|---|---|
| 7,424,619 B1* | 9/2008 | Fan ....................... | G06F 21/552 |
| | | | 713/188 |
| 10,261,851 B2* | 4/2019 | Velipasaoglu ...... | G06F 11/0787 |

(Continued)

OTHER PUBLICATIONS

European Patent Office, Search Report and Written Opinion issued in European patent application No. EP 19178728.2 dated Sep. 5, 2019, 5 pages.
(Continued)

*Primary Examiner* — John H Le
(74) *Attorney, Agent, or Firm* — Thompson Hine LLP (57) ABSTRACT

Methods of evaluating and deploying machine learning models for anomaly detection of a monitored system and related systems. Candidate machine learning algorithms are configured for anomaly detection of the monitored system. For each combination of candidate machine learning algorithm with type of anomalous activity, training and cross-validation sets are drawn from a benchmarking dataset. Using each of the training and cross-validation sets, a machine-learning model is trained and validated using the cross-validation set with average precision as a performance metric. A mean average precision value is then computed across these average precision performance metrics. A ranking value is computed for each candidate machine learning algorithm, and a machine learning algorithm is selected from the candidate machine learning algorithms based upon the computed ranking values. The selected machine learning model is deployed to a monitoring system that executes the deployed machine learning model to detect anomalies of the monitored system.

10 Claims, 7 Drawing Sheets

(58) Field of Classification Search
USPC .......................................................... 706/12
See application file for complete search history.

(56) References Cited

U.S. PATENT DOCUMENTS

| | | | |
|---|---|---|---|
| 2013/0198119 A1* | 8/2013 | Eberhardt, III | G06N 20/00 |
| | | | 706/12 |
| 2017/0061322 A1* | 3/2017 | Chari | G06F 21/55 |
| 2018/0248905 A1* | 8/2018 | Côté | H04L 63/1441 |

OTHER PUBLICATIONS

Renaudie David et al.: "Benchmarking Anomaly Detection Algorithms in an Industrial Context: Dealing with Scarce Labels and Multiple Positive Types", 2018 IEEE International Conference on Big Data (Big Data), IEEE, pp. 1228-1237, XP033507946, DOI: 10.1109/BIGDATA.2018.8621956 (Dec. 10, 2018).

National Institute of Industrial Property, Preliminary Search Report and Written Opinion issued in French Application No. 1855567 dated May 20, 2019, and English translation thereof.

Goldstein M et al., "A Comparative Evaluation of Unsupervised Anomaly Detection Algorithms for Multivariate Data", PLoS One vol. 11 No. 4, Apr. 19, 2016.

Nicolas Goix, "How to Evaluate the Quality of Unsupervised Anomaly Detection Algorithms?", Cornell University arXiv.org, Submitted Jul. 5, 2016.

* cited by examiner

SYSTEM AND METHOD FOR EVALUATING AND DEPLOYING UNSUPERVISED OR SEMI-SUPERVISED MACHINE LEARNING MODELS

FIELD OF THE INVENTION

The present invention relates generally to evaluation of machine learning models, and more particularly to methods and systems for evaluation, comparison, and deployment of machine learning models for anomaly detection.

BACKGROUND

Anomaly detection refers to the identification of novel or unusual patterns—also known as outliers—that do not conform to expected behaviour. In various contexts, alternative names are used for anomaly detection, including outlier detection, change detection, or novelty detection. Applications of anomaly detection algorithms include intrusion detection (e.g. identifying unusual network traffic), fraud detection (e.g. identifying suspicious patterns in credit card or other transaction data), and fault detection in distributed systems.

Recent advances in machine learning algorithms and technologies have resulted in more-widespread deployment of machine learning models for anomaly detection. It is important, however, that such models be appropriately configured, and critically evaluated, to ensure that they are sufficiently accurate and effective in detecting anomalous behaviours in the systems that they are used to monitor. There is, accordingly, a need for systems and methods that are able to evaluate machine learning models used for anomaly detection.

Many machine learning systems can be categorised as either 'supervised' or 'unsupervised'. A supervised system employs a labelled dataset to train a machine learning model to distinguish between classes of data, e.g. 'normal' data samples, labelled as 'negative', or unusual/anomalous data samples, labelled as 'positive'. Advantageously, portions of the labelled dataset may be held back for use in optimisation of the machine learning model (cross-validation), and for evaluation of the performance of a trained model (testing). An unsupervised system is one in which a suitable labelled dataset is unavailable, and which must therefore distinguish between different classes of data samples without the benefit of prior training. Falling between these two main categories are 'semi-supervised' systems, in which unlabelled samples are combined with a much smaller quantity of labelled samples for the purpose of training a machine learning model.

Anomaly detection can present particular challenges for machine learning systems. By definition, outlier events occur only rarely. Furthermore, in a production environment there may be no way to identify or define 'normal' versus one or more classes of 'anomalous' behaviour in advance. In such cases, large labelled datasets suitable for supervised learning, model evaluation, and testing are not available. A problem thus arises of how to evaluate and compare performance of unsupervised or semi-supervised anomaly detection algorithms, based on very limited human-labelled data, and potentially comprising several types of anomalies.

It is therefore desirable to provide new and improved methods and systems for evaluation, comparison, and deployment of machine learning models for anomaly detection.

SUMMARY

In one aspect, embodiments of the present invention provide a method of evaluating and deploying machine learning models for anomaly detection of a monitored system. The method includes providing a plurality of candidate machine learning algorithms configured for anomaly detection of the monitored system, and providing training data including a pool of negative data samples representing normal activity of the monitored system and one or more smaller pools of positive data samples. Each pool of positive data samples represents one type of anomalous activity of the monitored system. For each type of anomalous activity, a benchmarking dataset is generated that includes a first number of samples drawn from the pool of negative samples and a second number of samples drawn from the pool of positive samples corresponding with the type of anomalous activity. The first number of samples is substantially larger than the second number of samples. For each combination of a candidate machine learning algorithm selected from the plurality of candidate machine learning algorithms with a type of anomalous activity, drawing a plurality of training and cross-validation sets from the benchmarking dataset corresponding with the type of anomalous activity, training a machine-learning model based on the candidate algorithm using the training set and validating the machine-learning model using the cross-validation set with average precision as a performance metric for each one of the plurality of training and cross-validation sets, and computing a mean average precision value for the candidate machine learning algorithm across the average precision performance metrics obtained using the plurality of training and cross-validation sets. Each training set comprises only negative data samples, and each cross-validation set comprises a mix of negative and positive data samples. For each candidate machine learning algorithm, a ranking value is computed based upon at least the mean average precision values computed for the candidate machine learning algorithm for each type of anomalous activity. The method further includes selecting a machine learning model from the candidate machine learning algorithms based upon the computed ranking values, and deploying a machine learning model based on the selected algorithm to a monitoring system. As a consequence, the monitoring system executes the deployed machine learning model to detect anomalies of the monitored system.

Advantageously, embodiments of the invention are able to evaluate the performance of machine learning algorithms in detecting anomalies of multiple different types. Furthermore, by employing mean average precision as a performance metric, and constructing suitable benchmarking datasets for each type of anomaly, they are able to do so in a manner that provides a fair evaluation even when the number of data samples per anomaly type is small. Additionally, by drawing multiple training and cross-validation sets from each benchmarking dataset, and performing multiple validations in order to compute the mean average precision metric, variability in this performance metric is reduced, providing stability of results between evaluation runs.

Preferably, for all of the benchmarking datasets, a ratio of the first number of samples to the second number of samples comprises a single fixed value. Maintaining a constant ratio of negative-to-positive samples in the benchmarking datasets advantageously enables a fair comparison of the performance of candidate machine learning algorithms across different anomaly types, even when the number of available positive samples differs for each anomaly type.

Preferably, the ranking values are computed in accordance with a rank aggregation algorithm, which may employ a Spearman's footrule distance measure, and which may further employ a set of selectable importance values representing relative importance of each type of anomalous activity. Advantageously, this approach enables the performance of candidate machine learning algorithms to be uniquely compared and ranked across all anomaly types, such that a model may be selected for deployment having the best overall performance among the candidates, taking into account the fact that different types of anomaly may exhibit different ranges of mean average precision (i.e. that performance on some anomaly types is more strongly model-dependent than others), and that different types of anomaly may be of different importance.

In another aspect, embodiments of the invention provide an anomaly detection system configured to operate in accordance with the above-described method. In a further aspect, a computing system is provided for evaluating machine learning models for anomaly detection of a monitored system. The computer system includes a processor, at least one memory device accessible by the processor, and at least one data store accessible by the processor and containing a plurality of candidate machine learning algorithms configured for anomaly detection of the monitored system and training data including a pool of negative data samples representing normal activity of the monitored system and one or more smaller pools of positive data samples. Each pool of positive data samples represents one type of anomalous activity of the monitored system. The memory device contains a body of program instructions which, when executed by the processor, cause the computing system to, for each type of anomalous activity, generate a benchmarking dataset which comprises a first number of samples drawn from the pool of negative samples, and a second number of samples drawn from the pool of positive samples corresponding with the type of anomalous activity. The first number of samples is substantially larger than the second number of samples. The body of program instructions further cause the computing system to, for each combination of a candidate machine learning algorithm selected from the plurality of candidate machine learning algorithms with a type of anomalous activity, draw a plurality of training and cross-validation sets from the benchmarking dataset corresponding with the type of anomalous activity, train a machine-learning model based on the candidate algorithm using the training set and validate the machine-learning model using the cross-validation set with average precision as performance metric for each one of the plurality of training and cross-validation sets, and compute a mean average precision value for the candidate machine learning algorithm across the average precision performance metrics obtained using the plurality of training and cross-validation sets. Each training set comprises only negative data samples, and each cross-validation set comprises a mix of negative and positive data samples. The body of program instructions further cause the computing system to, for each candidate machine learning algorithm, compute a ranking value based upon at least the mean average precision values computed for the candidate machine learning algorithm for each type of anomalous activity.

In yet another aspect, the invention provides a computer program product comprising a tangible computer-readable medium having instructions stored thereon which, when executed by a processor implement a method comprising accessing a plurality of candidate machine learning algorithms (204) configured for anomaly detection of a monitored system and accessing training data (206) including a pool of negative data samples (302) representing normal activity of the monitored system and one or more smaller pools of positive data samples (304). Each pool of positive data samples represents one type of anomalous activity of the monitored system. For each type of anomalous activity, a benchmarking dataset (306) is generated (412) which comprises a first number of samples drawn from the pool of negative samples, and a second number of samples drawn from the pool of positive samples corresponding with the type of anomalous activity, wherein the first number of samples is substantially larger than the second number of samples. For each combination of a candidate machine learning algorithm selected from the plurality of candidate machine learning algorithms with a type of anomalous activity, the method includes drawing (414) a plurality of training and cross-validation sets (314, 316) from the benchmarking dataset corresponding with the type of anomalous activity, wherein each training set comprises only negative data samples, and each cross-validation set comprises a mix of negative and positive data samples, for each one of the plurality of training and cross-validation sets, training (416) a machine-learning model based on the candidate algorithm using the training set, and validating (418) the machine-learning model using the cross-validation set with average precision as a performance metric, and computing a mean average precision value for the candidate machine learning algorithm across the average precision performance metrics obtained using the plurality of training and cross-validation sets. For each candidate machine learning algorithm, the method further includes computing (608) a ranking value based upon at least the mean average precision values computed for the candidate machine learning algorithm for each type of anomalous activity.

Further aspects, advantages, and features of embodiments of the invention will be apparent to persons skilled in the relevant arts from the following description of various embodiments. It will be appreciated, however, that the invention is not limited to the embodiments described.

BRIEF DESCRIPTION OF THE DRAWINGS

Embodiments of the invention will now be described with reference to the accompanying drawings, in which like reference numerals refer to like features.

DETAILED DESCRIPTION

Figure 1:
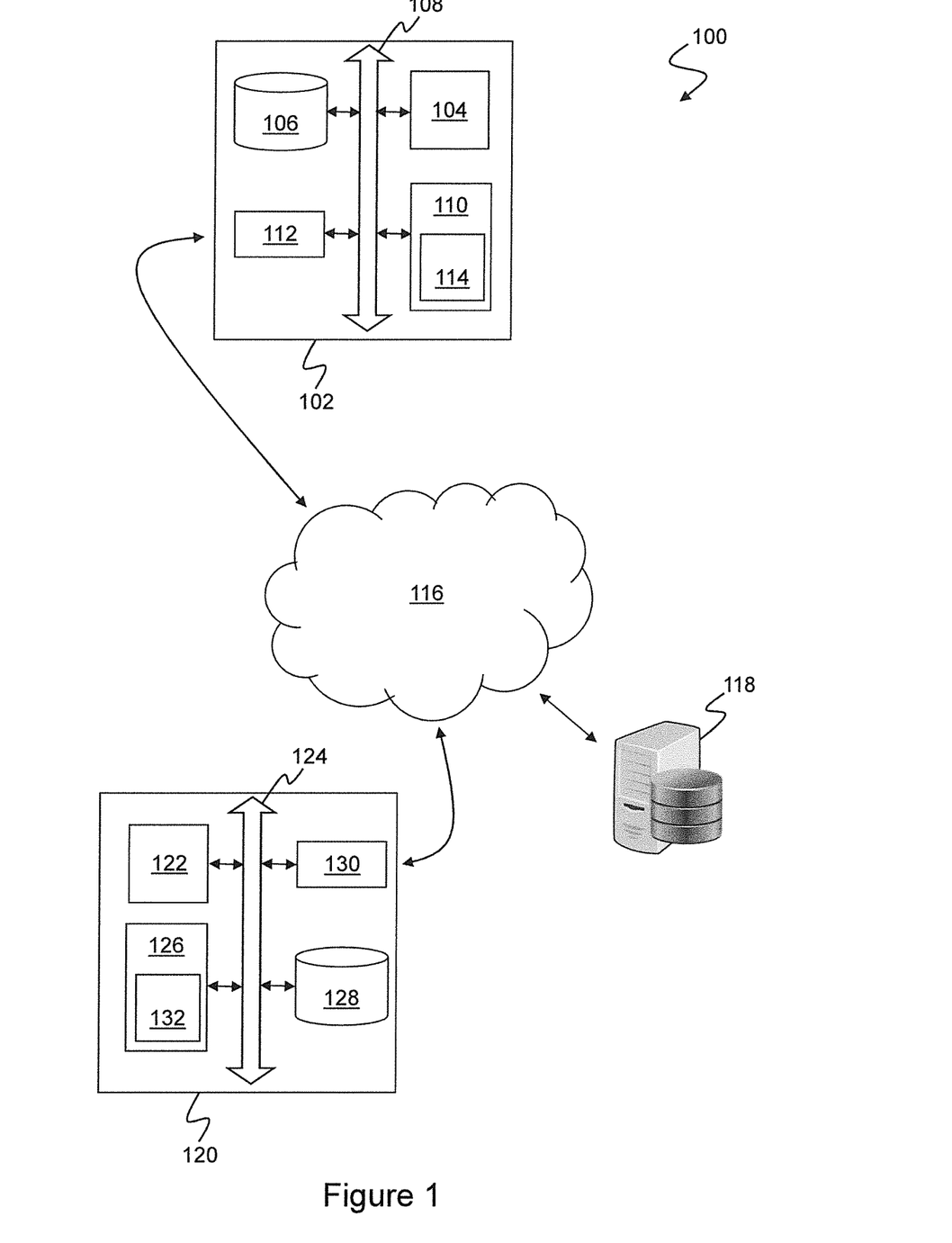
FIG. 1 is a schematic diagram illustrating an exemplary networked system embodying the invention.

FIG. 1 is a block diagram illustrating an exemplary networked system 100 including an evaluation system 102, which is configured to implement a method of evaluating and deploying one or more unsupervised or semi-supervised machine learning models, in accordance with an embodiment of the invention. The evaluation system 102 may comprise a computer system having a conventional architecture. In particular, the evaluation system 102, as illustrated, comprises a processor 104. The processor 104 is operably associated with a non-volatile memory/storage device 106, e.g. via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the evaluation system 102.

In a conventional configuration, the storage device 106 maintains known program and data content relevant to the normal operation of the evaluation system 102. For example, the storage device 106 may contain operating system programs and data, as well as other executable application software necessary for the intended functions of the evaluation system 102. The storage device 106 also contains program instructions which, when executed by the processor 104, cause the evaluation system 102 to perform operations relating to an embodiment of the present invention, such as are described in greater detail below, and with reference to FIGS. 2 to 6 in particular. In operation, instructions and data held on the storage device 106 are transferred to volatile memory 110 for execution on demand.

The processor 104 is also operably associated with a communications interface 112 in a conventional manner. The communications interface 112 facilitates access to a wide-area data communications network, such as the Internet 116.

In use, the volatile storage 110 contains a corresponding body 114 of program instructions transferred from the storage device 106 and configured to perform processing and other operations embodying features of the present invention. The program instructions 114 comprise a technical contribution to the art developed and configured specifically to implement an embodiment of the invention, over and above well-understood, routine, and conventional activity in the art of machine learning systems, as further described below, particularly with reference to FIGS. 2 to 6.

With regard to the preceding overview of the evaluation system 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), and/or other hardware devices suitable for efficient execution of required programs and algorithms. Computing systems may include conventional personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the term 'processing unit' is used in this specification to refer to any suitable combination of hardware and software configured to perform a particular defined task, such as accessing and processing offline or online data, executing training steps of a machine learning model, executing evaluation steps of a machine learning model, or executing anomaly-detection steps of a machine learning model. Such a processing unit may comprise an executable code module executing at a single location on a single processing device, or may comprise cooperating executable code modules executing in multiple locations and/or on multiple processing devices. For example, in some embodiments of the invention, evaluation of machine learning algorithms may be performed entirely by code executing on a single evaluation system 102, while in other embodiments corresponding processing may be performed in a distributed manner over a plurality of evaluation systems.

Software components, e.g. program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, the Python programming language, the R programming language, and/or other languages suitable for implementation of machine learning algorithms. Network and/or web-based services may be implemented using a range of suitable languages, including those already mentioned, and others such as JavaScript, HTML, PHP, ASP, JSP, Ruby, Perl, and so forth. These examples are not intended to be limiting, and it will be appreciated that any convenient languages or development systems may be employed, in accordance with system requirements. The descriptions, block diagrams, flowcharts, and so forth, presented in this specification are provided, by way of example, to enable those skilled in the arts of software engineering and machine learning to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

Continuing the discussion of FIG. 1, the networked system 100 also includes a monitored system 118. The monitored system 118 may be, for example, a database system, a transaction processing system, an information system, a web service provider system, an industrial system, a security system, a robotics system, or any other system for which it is desirable to perform monitoring to detect unusual, novel, outlying, or anomalous behaviours. The monitored system 118 may take any one of a number of forms, included centralised and distributed architectures. While a variety of terms are used for the type of monitoring to which embodiments of the present invention are directed (e.g. outlier detection, change detection, or novelty detection), in the present specification the term 'anomaly detection' is consistently employed, with the understanding that other terminology is commonplace in the art.

In this context, the relevant characteristic of the monitored system 118 is that it generates (e.g. on-line, in real time, or off-line, for subsequent analysis) or stores at least one dataset which may be analysed to identify items, events or observations which may not conform to expected, or 'normal', patterns or behaviours of the system 118. Depending upon the nature of the system 118, such anomalous patterns or behaviours may represent, e.g.: erroneous, inconsistent or corrupted database records; fraudulent transactions; attempted or actual attacks or security breaches; system errors or performance degradation; or impending or actual equipment failures.

A monitoring system 120 is configured to receive and analyse the dataset generated or stored by the monitored system 118. As shown, the monitoring system 120 may comprise a similar conventional architecture to that of the evaluation system 102, including a processor 122 operably associated via one or more data/address busses 124 with volatile storage 126, a non-volatile memory/storage device 128, and a communications interface 130.

The storage device 128 may contain operating system programs and data, as well as other executable application software necessary for the intended functions of the monitoring system 120. The storage device 128 also contains program instructions which, when executed by the processor 122, cause the monitoring system 120 to execute a machine learning model deployed to detect anomalies in the dataset generated or stored by the monitored system 118, as described further below with reference to FIG. 6. The volatile storage 126 contains program instructions and transient data relating to the operation of the monitoring system 120. In particular, an executable image 132 of the deployed machine learning model is loaded into memory 126, and executed to retrieve data generated or stored by the monitored system 118 via the communications interface 130, and to analyse the retrieved data to detect anomalies, as described further below with reference to FIG. 7.

In accordance with embodiments of the present invention, the overall operation of the networked system 100 may be summarised as follows. The function of the evaluation system 102 is to evaluate and rank a number of candidate machine learning algorithms by generating, for each algorithm, one or more corresponding candidate machine learning models using training and test data corresponding with normal and anomalous behaviours of the monitored system 118. Based upon this evaluation, a preferred algorithm is selected and deployed to the monitoring system 120. The monitoring system 120 then executes the deployed algorithm, resulting in an on-line model that is configured to detect anomalies in the operation of the monitored system 118. Advantageously, deployment of an anomaly detection model based on an algorithm that has been evaluated and selected according to an embodiment of the invention may result in more effective and accurate anomaly detection than would be achieved using a model deployed using an alternative method of development and selection. This can result in a reduction in the costs of monitoring and operating the monitored system 118, as will be discussed further with reference to FIG. 7.

Figure 2:
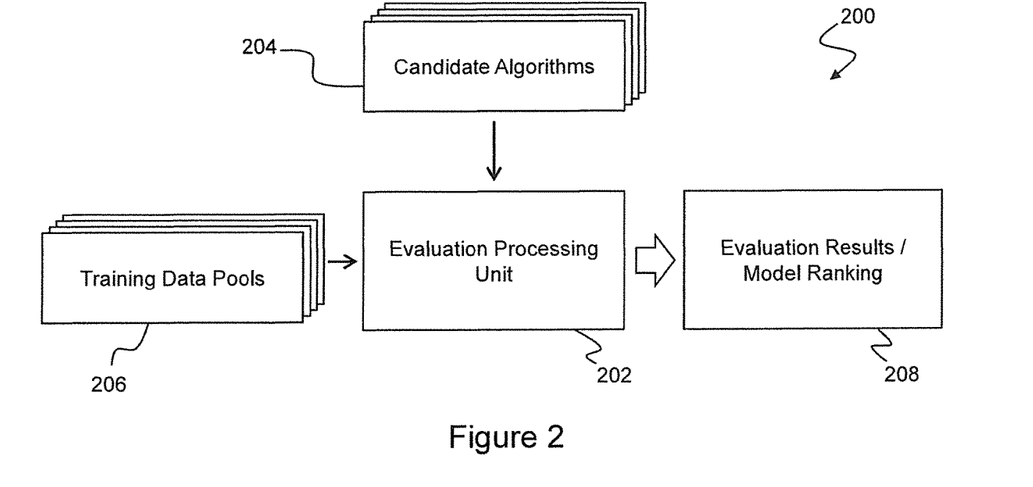
FIG. 2 is a block diagram illustrating the main processing and data components of an evaluation system embodying the invention.

Turning now to a detailed description of the operation of the evaluation system 102, FIG. 2 is a block diagram 200 illustrating the main processing and data components of the system. An evaluation processing unit 202 comprises hardware and software configured to perform evaluation and ranking of anomaly detection algorithms as will be described with reference to FIGS. 3 to 5. The inputs to the evaluation processing unit 202 comprise a number of candidate algorithms 204, and one or more training data pools 206 which correspond with behaviours and datasets associated with the monitored system 118. The output of the evaluation processing unit is a set 208 of evaluation results, which may include scores and/or rankings of candidate algorithms 204, as will be described with reference to FIG. 5 in particular. It should be appreciated by persons skilled in the art of machine learning systems, particularly as such systems are applied to anomaly detection, that the operations and algorithms implemented within the evaluation processing unit 202 are not well-understood or conventional, but represent a specific contribution of the present invention. The following discussion, with reference to FIGS. 3 and 4 in particular, is intended to describe these operations and algorithms in sufficient detail to enable such skilled persons to put them into practical effect using suitable software development and hardware platforms, such as have already been discussed above with reference to FIG. 1.

Figure 3:
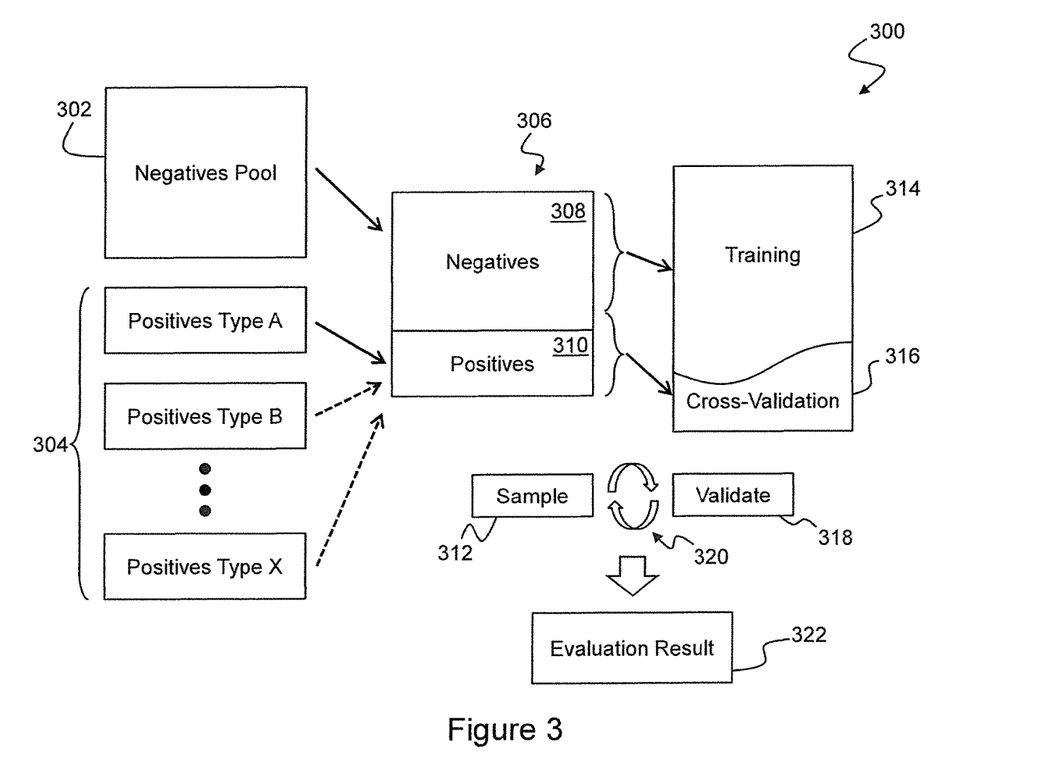
FIG. 3 is a block diagram illustrating data processing performed by an exemplary data processing unit of the evaluation system.

FIG. 3 is a block diagram 300 illustrating data processing performed by an exemplary data processing unit 202. The training data pools 206 comprise a 'negatives pool' 302, and one or more 'positives pools' 304. According to this terminology, the negatives pool 302 comprises data samples corresponding with 'normal' (i.e. non-anomalous) items, events or observations of the monitored system 118. Each positives pool 304 comprises data samples corresponding with a predetermined 'type' of anomaly, designated 'type A', 'type B', and so forth, for purposes of illustration. It is a particular advantage of embodiments of the present invention that it is possible to evaluate the performance of candidate models based upon algorithms 204 in detecting multiple different anomaly types. For example, in a network security application, a first type of anomalous behaviour may be associated with a distributed denial of service (DDoS) attack, while a second type of anomalous behaviour may be associated with an intrusion attack. Each negative or positive data sample may comprise a particular sequence of values and/or a structured record corresponding with monitoring data available from the monitored system 118 from which an input vector can be constructed in accordance with requirements of the candidate algorithms 204.

Embodiments of the invention are particularly suited to evaluation of algorithms 204 corresponding with unsupervised or semi-supervised candidate models, for which there is only very limited availability of labelled training data. The negatives pool 302 may comprise little or no labelled training data, and may be principally populated using a large number of samples gathered from sources including real data from a monitored system 118 in normal operation, and/or additional generated, synthesised, and/or randomised samples that have been normalised or selected to avoid the presence of anomalous items, events, or behaviours. For example, in a practical embodiment of the invention, several tens of thousands (or more) of negative samples may be required, and it may therefore be impractical to populate a sufficiently large negatives pool with manually-labelled samples. According to one approach for obtaining negative samples, non-anomalous data prepared for other purposes, such as for testing normal operation of the monitored system 118, may be employed. According to an alternative approach, samples drawn from the monitored system 118 may be 'screened' using a pre-existing (and potentially non-optimal) anomaly detection algorithm to identify and remove samples exceeding a predetermined conservative threshold probability of being anomalous in order to generate a negatives pool 302. The use of a conservative threshold enables false negatives (which would allow anomalous samples into the negatives pool) to be substantially avoided, at the expense of a high rate of false positives, which do not significantly impact the validity of the negatives pool. Suitable selection of the threshold thus enables anomalous samples to be rejected, while still obtaining non-anomalous samples that are representative of realistic usage of the monitored system 118. Furthermore, this approach enables relatively simple anomaly detection algorithms to be employed to obtain samples for the negatives pool 302. The two approaches outlined above may be combined with each other, and/or with other methods for obtaining negative samples Each positives pool comprises a small number of labelled real data samples corresponding with anomalous items, events, or behaviours of the monitored system 118. Samples within the positives pool are derived from anomalies observed in the past by experts which have been gathered from a production system. In view of the fact that anomalous activity is, by definition, rare, the number of samples of each type is typically only on the order of a few to a few tens of samples. Advantageously, embodiments of the invention are able to operate effectively with such small numbers of positive samples.

For each type of anomaly, the evaluation processing unit 202 is configured to generate a benchmarking dataset 306. In particular, the evaluation processing unit 202 is programmed to construct a benchmarking dataset 306 that comprises a relatively large number of negative samples 308 drawn from the negatives pool 302, along with the positive samples 304 available for the specific type of anomaly. In preferred embodiments, the ratio of the number of negative samples 308 to the number of positive samples 310 is held constant across all anomaly types. For example, the ratio of negative samples 308 to positive samples 310 may be in a range of between about 100 to about 1000 (i.e. about 0.1% to about 1.0% positive samples). In particular embodiments, the ratio of negative samples 308 to positive samples 310 may advantageously be in a range of between about 100 to about 500 (i.e. about 0.1% to about 0.2% positive samples). Thus, for example, where a smaller number of positive samples 310 is available in relation to a particular type of anomaly, the number of negative samples 308 drawn from the negatives pool 302 is correspondingly smaller in order to maintain a constant ratio. More precisely, if a parameter r represents the required ratio, and $N_{pos,X}$ is the number of positive samples available for anomaly type X, then the number of negative samples $N_{neg,X}$ drawn from the negatives pool is given by $N_{neg,X} = rN_{pos,X}$.

The evaluation processing unit 202 is further configured to employ the benchmarking pool 306 to train and validate one or more candidate anomaly detection machine learning models corresponding with the candidate algorithms 204. Specifically, the evaluation processing unit 202 includes a sampling unit 312, which is a software component configured to randomly sample the benchmarking dataset 306 in order to generate a training set 314 and a cross-validation set 316. The sampling unit 312 is programmed to generate the training set 314 such that it comprises only negative samples, and to generate the validation set 316 such that it comprises both negative and positive samples.

The evaluation processing unit 202 also comprises a validation unit 318, which is a software component configured to train a candidate model embodying one of the candidate algorithms 204 using the training set 314, and validate the trained model using the validation set 318. As discussed in further detail below, the validation unit 318 is specifically programmed to compute a validation metric comprising an average precision (AP) value.

The evaluation processing unit 202 is configured to iterate 320 between execution of the sampling unit 312 and the validation unit 318. On each iteration, different random training and validation sets 314, 316 are generated by the sampling unit 312, resulting in a different AP value computed by the validation unit 318. Following a number of iterations, the evaluation processing unit 202 computes a mean average precision (MAP) for the candidate algorithm 204 as an evaluation result 322. MAP is a metric commonly used for evaluation of information retrieval (e.g. search engines) and recommender systems, where it acts as a measure of how effective the system is at selecting and ranking 'correct' results for presentation to a user. In accordance with embodiments of the present invention, MAP is employed as a measure of how effective a given candidate algorithm is at identifying anomalous samples (i.e. the 'positives') of a particular type within a benchmarking dataset comprising a larger number of non-anomalous samples (i.e. the 'negatives'). As persons skilled in the art will appreciate, commonly-used metrics in the context of anomaly detection include, e.g. precision, recall, F-score. The use of MAP as a metric in this context is unconventional, and has been found by the inventors to provide substantial improvements in benchmarking performance.

In machine learning systems, 'precision' is conventionally defined as the fraction obtained by dividing the number of actual events in a given class (i.e. 'true positives') by the number of events predicted of that class as predicted by a model (i.e. including both 'true positives' and 'false positives'). This concept may be extended to a series of predictions (e.g. ranked results in an information retrieval system or, in the present case, a series of items, events, observations of behaviours of the monitored system 118 identified as either 'normal' or 'anomalous'), whereby precision is computed for each sample based upon results from the beginning of the series. Average precision is then determined by dividing the sum of all of the computed precision values by the number of predicted positives. The maximum value of AP is thus 1.0, and any false positives (i.e. 'normal' samples erroneously identified as 'anomalous') and/or false negatives (i.e. undetected 'anomalous' samples) result in reduced AP.

Finally, MAP is computed simply by averaging the AP values obtained over multiple iterations of model evaluation for the given anomaly type, wherein each iteration employs different training and cross-validation sets 314, 316, generated by the sampling unit 312 as described above.

This procedure is generally repeated for each type of anomaly, and for each candidate algorithm 204, so that a distinct MAP evaluation result is computed for every combination of candidate algorithm 204 and anomaly type.

As noted above, the benchmarking pool 306 may be used to train multiple candidate anomaly detection machine learning models for each one of the candidate algorithms 204. Embodiments of the present invention are not limited to any particular machine learning models or algorithms, and can be employed to evaluate a wide range of unsupervised and semi-supervised anomaly-detection algorithms. To facilitate evaluation, models based upon the candidate algorithms 204 are preferably configured to present a common interface to the evaluation processing unit 202. For example, in preferred embodiments the candidate models may be configured to accept input in the form of one or more data vectors, each of which is constructed from a particular sequence of values and/or a structured record corresponding with monitoring data available from the monitored system 118, and to provide an output comprising an indication of whether an input vector corresponds with a 'normal' or 'anomalous' item, event, observation or behaviour of the monitored system 118.

Internally, each candidate model comprises data structures and/or executable code implementing a particular unsupervised or semi-supervised anomaly-detection algorithm of the candidate algorithms 204. A model may implement distinct training and operational modes, and/or may operate in a continuous learning/detection mode. A training mode may employ an optimisation algorithm, such as a gradient descent algorithm, to determine internal model parameters, which may be deactivated to prevent further adaptation in an operational mode. A continuous learning/detection mode may update internal model parameters in an ongoing manner based upon the model inputs. For models having a distinct training mode, the evaluation processing unit 202 is configured to select the training mode when training the model using the training set 314, and switch to the operational mode when validating the model using the cross-validation set 316. For models having no distinct training mode, no separate mode selection is required. In either case, the training and cross-validation processes as implemented by the evaluation processing unit 202 are distinguished by the fact that the model output is required only during the cross-validation process during which it is used by the validation unit 318 to compute the AP validation metric.

Algorithms suitable for evaluation in accordance with the invention include (but are not limited to): density-based algorithms (e.g. local outlier factor); one-class support vector machines; neural networks (e.g. Deep Auto-Encoders); cluster-based algorithms; probabilistic-based algorithms (e.g. Gaussian Mixture Models, Least Square Anomaly Detection); proximity-based algorithms (e.g. k-Nearest-Neighbours, Mahalanobis distance); subspace-based algorithms (e.g. based on Principal Component Analysis); and isolation methods (e.g. Isolation Forest). As will be appreciated by persons skilled in the art of machine learning, many models and algorithms are characterised by one or more hyperparameters, and thus candidate models based upon various candidate algorithms 204 may include models of the same underlying type, and having different hyperparameter values resulting in different performance.

Furthermore, the performance of particular models may be dependent upon selection of particular features as input (i.e. so-called 'feature engineering'). Feature vectors for such models are generally derived or computed from the 'raw' input data vectors, i.e. the inputs which, in embodiments of the present invention, are constructed from particular sequences of values and/or structured records corresponding with monitoring data available from the monitored system 118. Accordingly, models based upon the candidate algorithms 204 may include models of the same or different underlying types, and employing different internal methods to derive feature vectors for input to the underlying algorithms.

Figure 4:
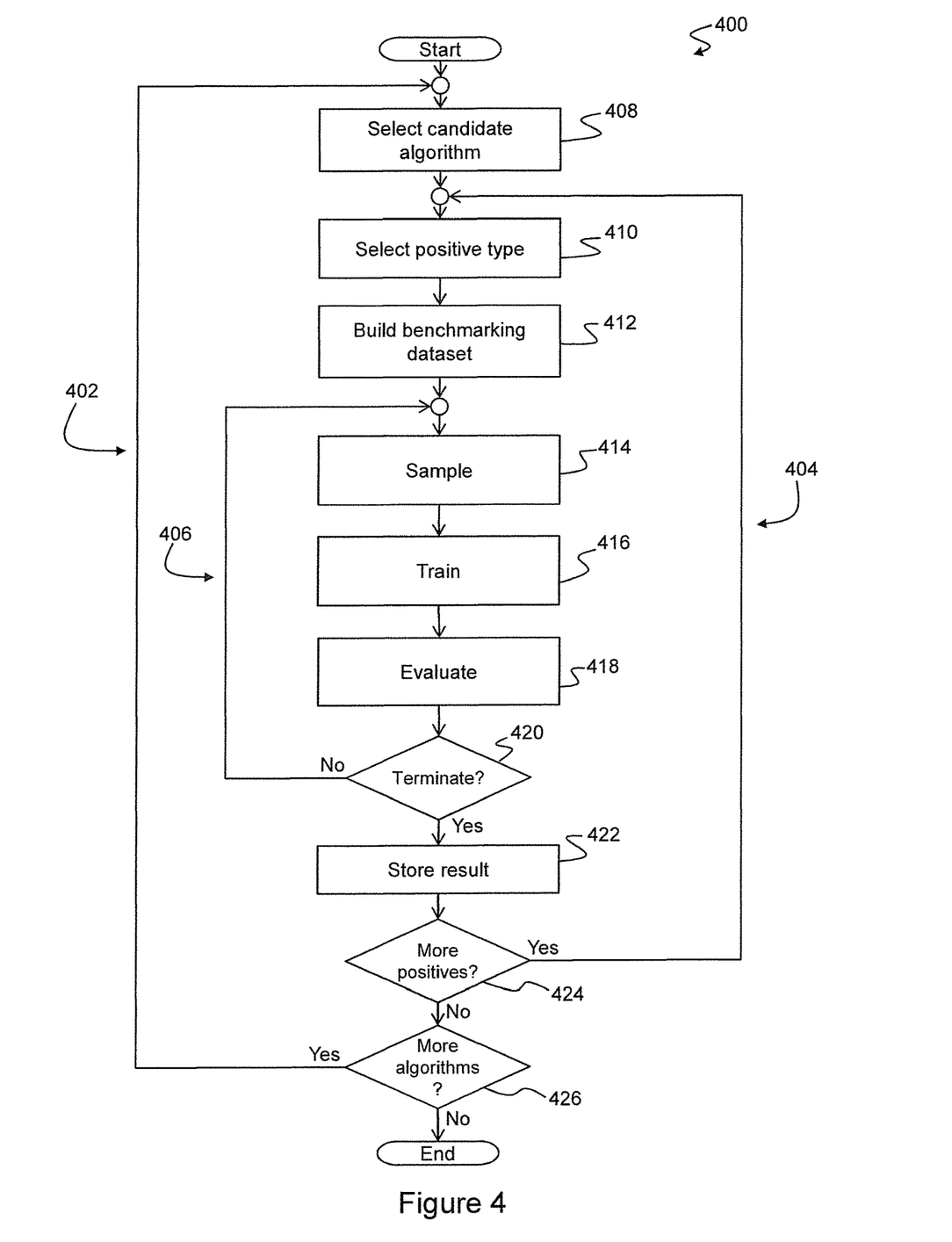
FIG. 4 is a flowchart illustrating a method of evaluating a plurality of candidate machine learning algorithms with respect to multiple distinct anomaly types, according to embodiments of the invention.

FIG. 4 is a flowchart 400 illustrating a method of evaluating a plurality of candidate machine learning algorithms 204 with respect to multiple distinct anomaly types. The flowchart 400 incorporates the data-processing components and elements discussed above with reference to FIGS. 2 and 3. The overall method comprises three nested loops: an outermost loop 402 over candidate algorithms 204; a loop 404 over sample sets 304 corresponding with different types of anomaly; and an innermost loop 406 corresponding with iteration 320 over sampling and training/validation of models.

At step 408, a candidate algorithm is selected from the available candidate algorithms 204. At step 410 an anomaly type is selected, and the corresponding set of positive samples 304 is retrieved. At step 412, a benchmarking dataset 306 is built from the selected positive samples and samples retrieved from the negatives pool 302.

The innermost loop 406 is then executed to compute a MAP metric for the selected algorithm and anomaly type. In particular, as has been described above with reference to FIG. 3, training and cross-validation sets 314, 316 are sampled from the benchmarking set 306 by the sampling unit 312, at step 414. The validation unit 318 then computes an AP metric based upon these samples by executing a training step 416 using the training set 314, and a cross-validation step 418 using the cross-validation set 316 to train and evaluate a model based upon the selected algorithm. Each execution of these three steps 414, 416, 418 results in an additional AP metric. A test 420 is then performed against a termination condition and, if the condition is not satisfied, control returns to step 414. Various termination conditions may be employed in different embodiments of the invention. For example, a simple termination condition is whether the total number of executions of the loop 406 has reached a predetermined value. More sophisticated termination conditions may be employed, e.g. based upon statistics of the AP metrics produced at each iteration. For example, mean (i.e. MAP) and variance of the AP metrics may be computed following each iteration, and a termination condition defined based upon the variance, or a confidence interval around the mean value, reducing below a predetermined threshold.

When the termination condition is satisfied, control passes to step 422, in which the results, including overall MAP and any other desired values (e.g. the individual AP's and/or further statistics of the AP's), are stored for future use.

A check 424 is then performed to determine whether there are further anomaly types for which the selected candidate algorithm is to be evaluated, and if so then control returns to step 410 in accordance with the loop 404. Otherwise, control passes to a test 426 of whether there are further candidate algorithms 204 to be evaluated, and if so then control returns to step 408 in accordance with the outermost loop to select and evaluate the next candidate.

It will be understood from the foregoing discussion that the algorithm represented by the flowchart 400, and the corresponding system architecture represented by the block diagrams 200, 300 are not well-understood or conventional in the field of anomaly detection, and represent a specific contribution of the present invention. Furthermore, while certain individual steps in the process 400 may be conventional in the sense that they may be readily-implemented by persons skilled in the art without need of further detailed description in the present specification, the overall combination and sequence of steps, and the flow control among steps, require specific programming such that the overall algorithm and its implementation amount to significantly more than any of the underlying concepts or individual steps or processes.

Figure 5A:
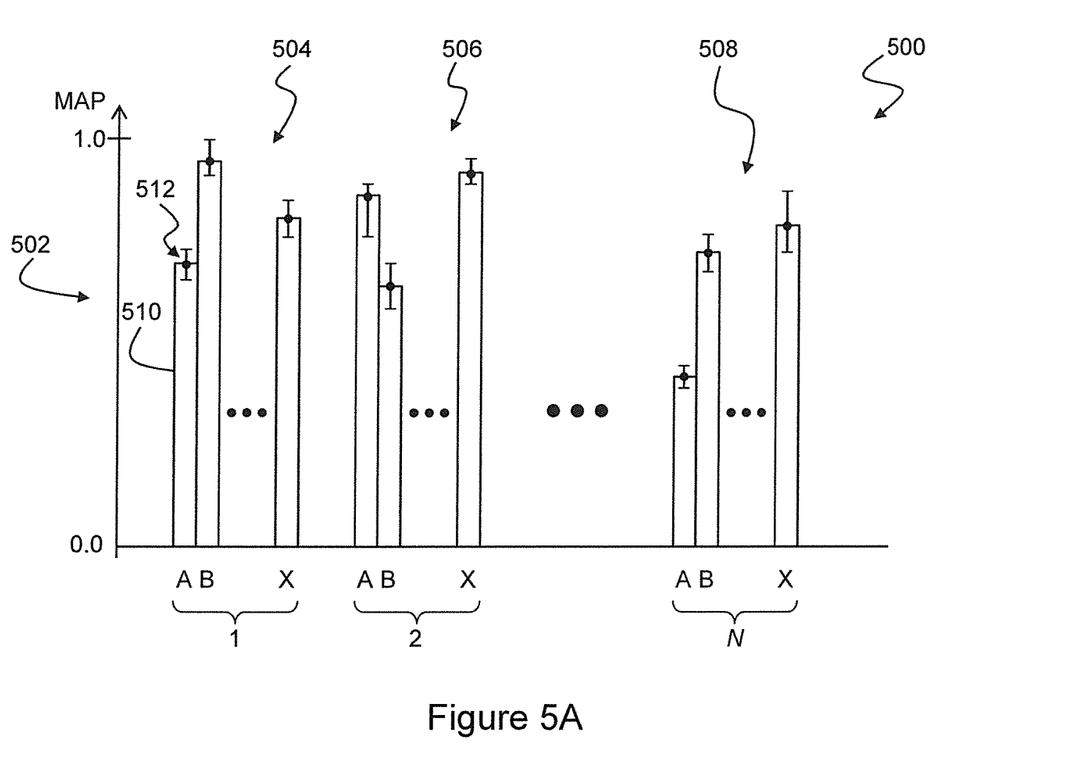
FIG. 5A shows a chart illustrating a mean average precision comparison with confidence intervals.

Following completion of the process illustrated by the flowchart 400, the output is a set of results including the MAP, and possibly other data, computed for each anomaly type with each candidate algorithm 204. In some embodiments of the invention, additional stored data may include statistical information, such as AP variances and/or MAP confidence intervals. Such a result set can be represented graphically, e.g. as illustrated in FIG. 5A which shows a chart 500 illustrating a MAP comparison with confidence intervals.

In particular, the chart 500 is a schematic illustration of a hypothetical, but representative, result set in which the vertical axis 502 is a measure of MAP which ranges between 0.0 and 1.0. Each group of columns in the chart, e.g. 504, 506, 508, represents results for a plurality of anomaly types (A, B, . . . , X) corresponding with each one of N candidate algorithms (numbered 1 . . . N). The height of each column, e.g. 510, presents the MAP value computed for the corresponding algorithm number and anomaly type (i.e. $MAP_{1A}$, $MAP_{1B}$, . . . $MAP_{1X}$, . . . $MAP_{NX}$). The error bars, e.g. 512, represent the associated confidence intervals.

It should be appreciated that the magnitude of the confidence intervals (or, equivalently, of the variance associated with each MAP value) may be continuously reduced, albeit at increasing computational cost, by increasing the number of iterations 320 of the inner loop 406. It is, accordingly, a particular advantage of embodiments of the invention that the precision of the evaluation metrics (i.e. MAP values) can be controlled. This ensures that the evaluation algorithms are stable, i.e. that the metrics are reproducible and do not vary greatly between evaluation runs, despite the small number of available positive samples, and the random processes involved in the selection and sampling for benchmarking, training and cross-validation data sets. This represents a specific improvement contributed by the invention to the technical field of evaluation, comparison and ranking of unsupervised and semi-supervised machine learning algorithms for anomaly detection.

Figure 5B:
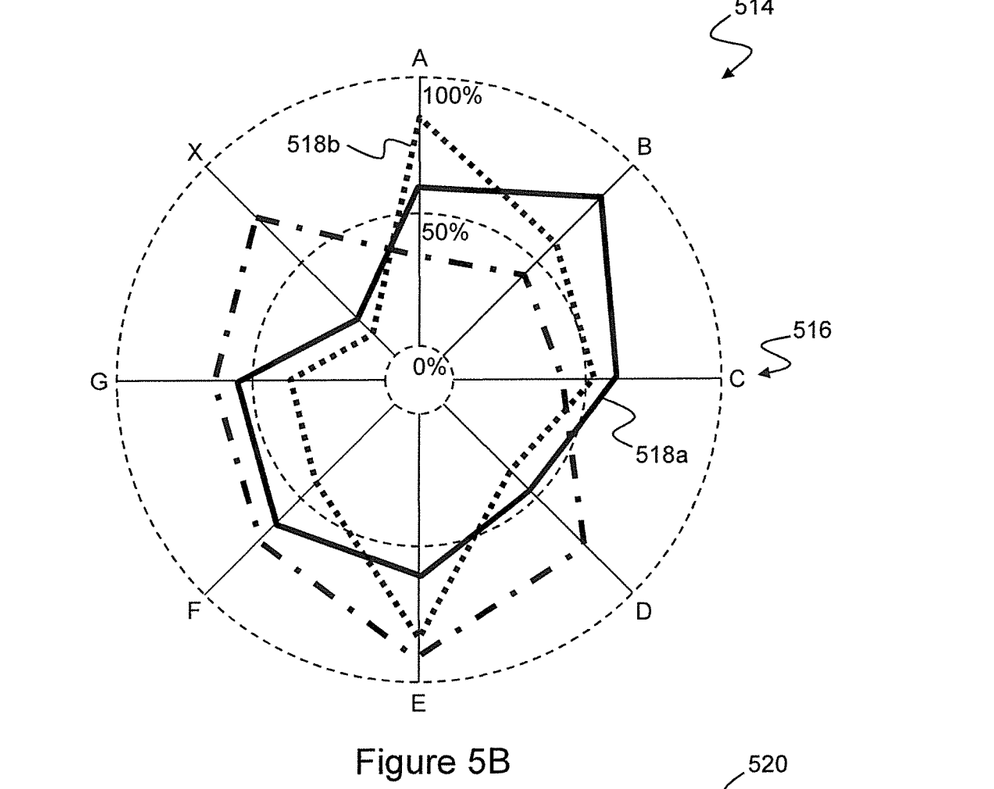
FIG. 5B shows a radar plot illustrating simultaneous visualisation of performance of multiple anomaly detection algorithms in relation to multiple distinct anomaly types.

As illustrated in the chart 500, where there are multiple candidate algorithms, and multiple types of anomaly, the performance of each candidate algorithm may vary across the different anomaly types. As a result, some algorithms may exhibit superior performance to other algorithms in relation to certain types of anomaly, but inferior performance in relation to different types of anomaly. An alternative representation of comparative performance of candidate algorithms is shown in FIG. 5B, in the form of a 'radar plot' 514, in which the different anomaly types (A, B, . . . , X), e.g. 516, are represented by location around the circumference of the plot, and performance of each algorithm by traces, e.g. 518*a*, 518*b*, joining radial points corresponding with the MAP performance metric in respect of each anomaly type. For example, in the radar plot 514, a first candidate algorithm represented by trace 518*a* is shown to have superior performance to a second candidate algorithm represented by trace 518*b* in relation to Anomaly Type B, but inferior performance in relation to Anomaly Types A and E. As can be appreciated from this example, the radar plot 514 is particularly advantageous in providing simultaneous visualisation of performance of multiple anomaly detection algorithms in relation to multiple distinct anomaly types. It may be desirable, however, to select a single candidate algorithm that provides the best performance over all anomaly types, according to some suitable measure. Embodiments of the present invention accordingly implement such a measure, in the form of a ranking score.

Figure 5C:
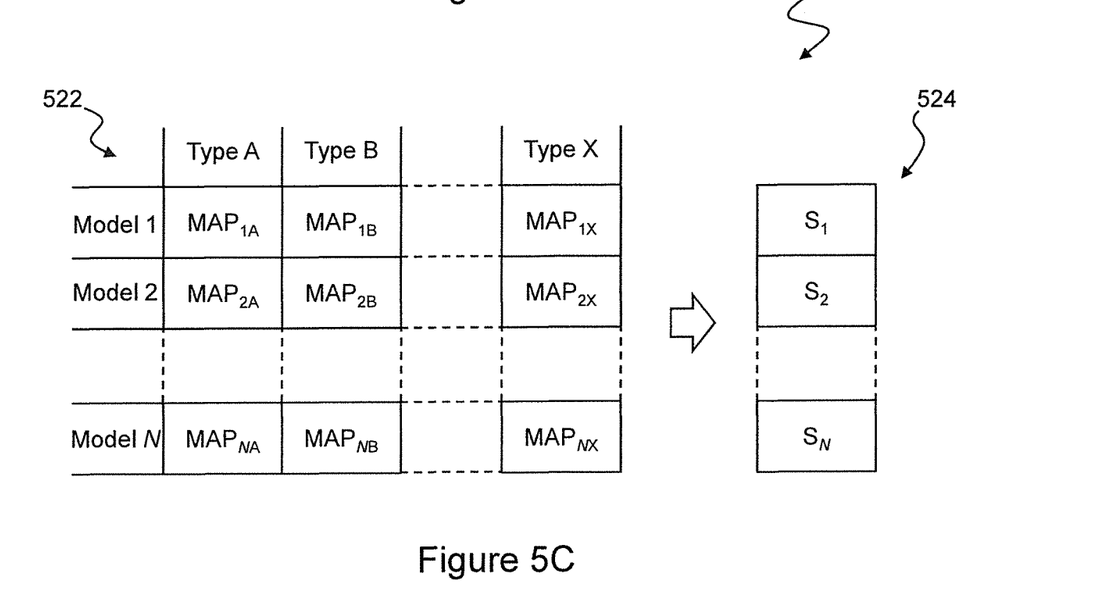
FIG. 5C illustrates generation of a set of ranking scores for a plurality of candidate algorithms.

Generation of a set of ranking scores 520 for a plurality of candidate algorithms 204 is illustrated in FIG. 5C. In particular, MAP metrics for each candidate algorithm and anomaly type are represented as a matrix 522 in which each row corresponds with the metrics of a single candidate algorithm across all anomaly types. For each row a single ranking score, $S_1 \ldots S_N$, is computed, e.g. 524. It should be noted that the ranking score for each row need not be based solely upon the metric values in the corresponding row of the matrix 522, but may also take into account values in other rows, e.g. the relative magnitudes of MAP values obtained for other candidate algorithms, and/or variations in MAP values across different candidate algorithms. The ranking scores may be arbitrary numerical values, whereby the relative magnitudes of the scores determine ranking of the candidate algorithms, or they may simply be ranking values, e.g. integers representing a ranking order of candidate algorithms. Preferably, the ranking scores are computed according to an algorithm that can accommodate the fact that different types of anomaly may exhibit different ranges of MAP (i.e. that performance on some anomaly types is more strongly model-dependent than others), and that different types of anomaly may be of different importance.

In order to achieve these desired objectives, particular embodiments of the invention compute ranking scores 520 in accordance with an approach termed 'Spearman's weighted rank aggregation with relative importance'. This is a rank aggregation algorithm in which each anomaly type is allocated a relative importance value, and an optimum ranking is computed taking into account these importance values. The importance values may be allocated by a human operator, e.g. based upon the relative practical significance of each type of anomaly. The Spearman algorithm also employs weights that are automatically derived from the absolute values of the MAP on each axis (i.e. positive type), in addition to the simple ranks that are derived from those MAP values. Spearman's footrule (i.e. the sum of the absolute differences between the ranks of all unique elements from a pair of ordered lists combined) is used as the basic 'distance' measure for candidate rankings. Implementations of this rank aggregation algorithm are available in a number of software packages, e.g. the 'BruteAggreg' function in the 'RankAggreg' package of the R programming language, with the 'weights' parameter set to a list of the desired importance values, and the 'distance' parameter set to 'Spearman'. Alternatively, a dedicated implementation of the rank aggregation algorithm may be incorporated into the evaluation processing unit 202.

Figure 6:
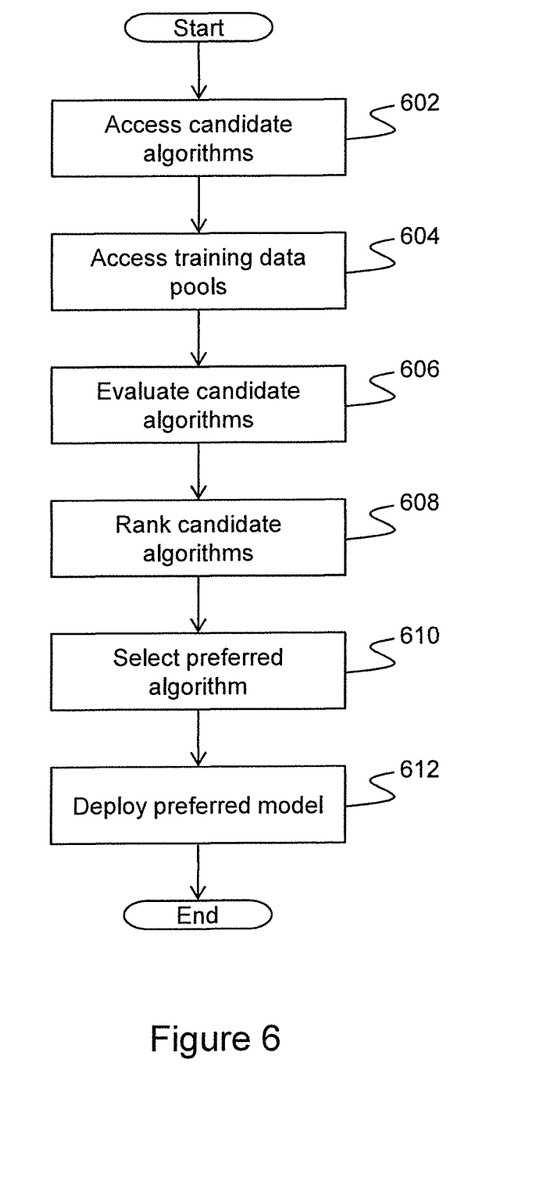
FIG. 6 is a flowchart illustrating an exemplary method of evaluating and deploying a machine learning model for anomaly detection.

Turning to FIG. 6, there is shown a flowchart illustrating an exemplary method of evaluating and deploying a machine learning model for anomaly detection. According to this method, at step 602 a set of candidate algorithms 204 is accessed and/or retrieved, e.g. from one or more data storage devices. As discussed above, the candidate algorithms comprise data structures and/or executable code implementing particular unsupervised or semi-supervised anomaly-detection algorithm that have been suitably developed or configured for use with the evaluation system 102. At step 604, training data pools 206 are accessed and/or retrieved. At step 606 (corresponding with the procedure described above with reference to FIG. 4) the candidate algorithms 204 are evaluated. At step 608 (corresponding with the procedure described above with reference to FIG. 5B) the candidate algorithms 204 are ranked. A preferred algorithm is thereby identified and selected 610 for deployment.

At step 612, a model embodying the selected algorithm is deployed. In particular, an implementation of the selected algorithm may be deployed to the monitoring system 120, where it may be trained using production (live) data to produce deployed production models configured to detect anomalous behaviours in the monitored system 118. 'Negative' training data samples may be obtained in a similar manner to the negatives pool 302 used in benchmarking, e.g. by 'screening' live data samples using a pre-existing model with a conservative threshold setting to avoid false negatives. Alternatively, e.g. in the event that screened recent production data has been used to generate the negatives pool 302 for benchmarking, it may be feasible to deploy a model implementation that has been pre-trained using this data. Deployment of code embodying the selected algorithm/model may involve, for example, packaging the code and data structures comprising the algorithm/model (either pre-trained or untrained) into an installable component, transmitting the packaged code and data to the monitoring system 120, and executing a deployment tool (e.g. package manager) to install and configure the selected algorithm/model prior to execution.

Figure 7:
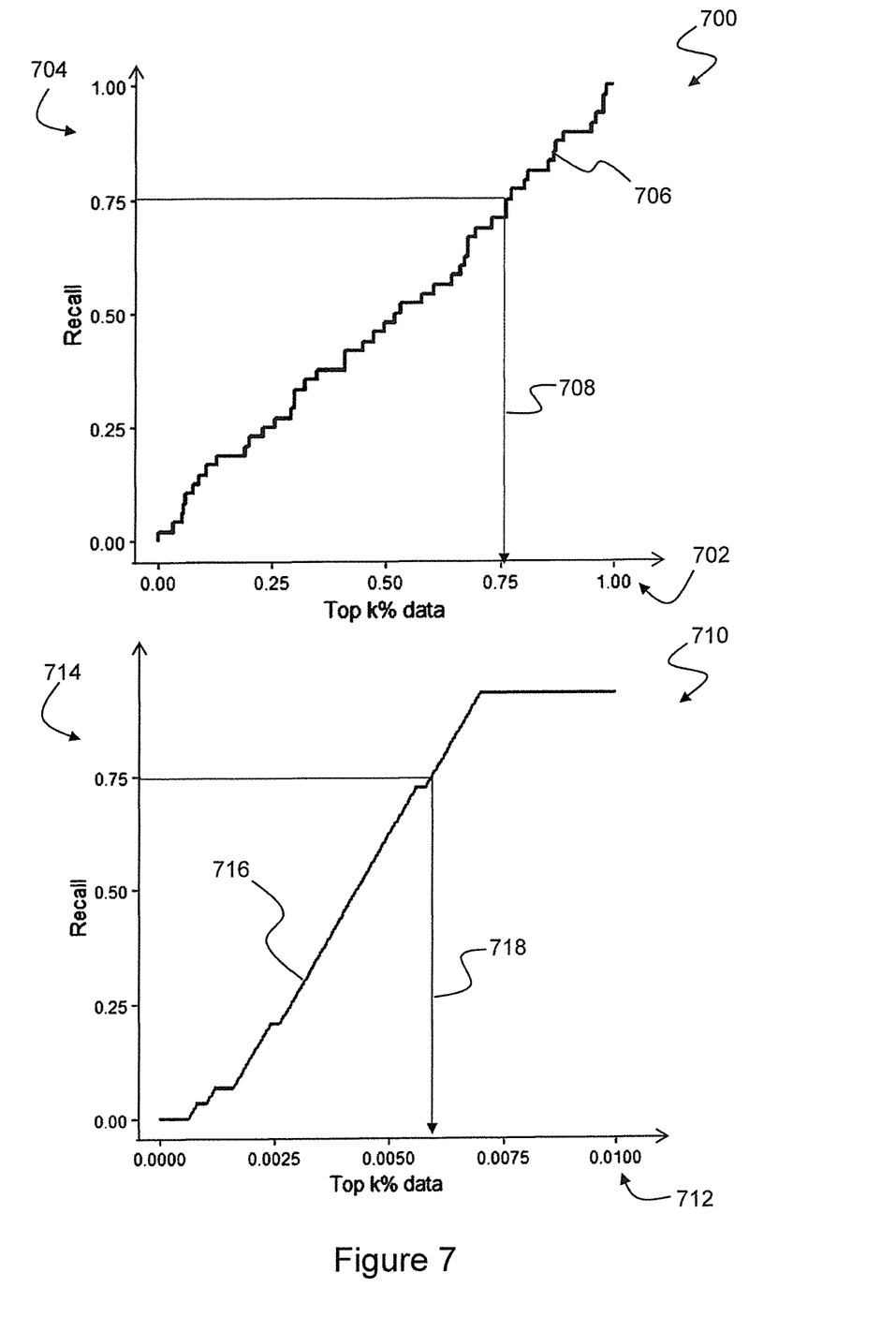
FIG. 7 shows two charts illustrating the significant impact of deploying models with improved effectiveness, according to an evaluation conducted according to an embodiment of the present invention, in the case of a fraud detection application.

Following deployment, the selected model may be executed to commence monitoring of the monitored system 118. A key performance parameter of the operating monitoring system is its recall, i.e. the rate or fraction of correct detection of anomalous items, events, observations or behaviours of the monitored system 118. In practical or commercial terms, for example in the case of a fraud detection system, a typical key performance indicator (KPI) is the number or proportion of actual observations of the monitored system 118 that must be analysed by a human operator in order to catch a given proportion of all fraud attempts. FIG. 7 shows two charts illustrating the significant impact of deploying models with improved effectiveness, according to an evaluation conducted according to an embodiment of the present invention, in the case of a fraud detection application.

The chart 700 shows a baseline case, in which observations are sampled at random for review by a human operator. The horizontal axis 702 represents the fraction of data sampled, while the vertical axis 704 represents the corresponding effective recall of the random sampling system. As indicated by the recall curve 706, in order to catch 75% of all fraud attempts, it is necessary to sample and review 75% of all observations, i.e. as indicated by the vertical drop 708. For a large transaction processing system, this may represent hundreds of thousands of transactions per day, requiring thousands of operator-days to analyse the selected samples.

The chart 710 illustrates a case employing a preferred anomaly detection algorithm evaluated and selected from a plurality of candidate algorithms according to an embodiment of the present invention. The horizontal axis 714 represents the fraction of data observations detected as anomalous by the selected algorithm, while the vertical axis 704 represents the corresponding recall of the model. As indicated by the recall curve 716, in order to catch 75% of all fraud attempts, it is necessary in this case to review only 0.6% of all observations, i.e. as indicated by the vertical drop 718. This is an improvement over the random sampling baseline by a factor of 125 times, reducing the number of operator-days required to analyse the identified samples by a corresponding factor.

It is therefore apparent that improvements in the effectiveness of deployed anomaly detection algorithms may have very significant technical, practical and commercial advantages. Embodiments of the present invention provide an effective, systematic approach to evaluation, selection, and deployment of candidate anomaly-detection algorithms. Methods, systems and algorithms embodying the invention as disclosed herein enable consistent, stable, and repeatable comparative evaluation and ranking of candidate anomaly-detection algorithms, and operate reliably in challenging cases, such as where there are multiple distinct anomaly types, and very small numbers of examples of anomalous items, observations, events, or behaviours of a monitored system. The approach provided in accordance with the invention is substantially agnostic to the nature of monitored system, and of the types of anomalies to be detected, so long as suitable pools of negative and positive samples can be obtained or constructed, and a minimal set of data interface characteristics are satisfied by the corresponding candidate algorithms. Embodiments of the invention are therefore considered to provide a notable improvement over prior art approaches to the evaluation of algorithms and deployment of machine learning models for anomaly detection.

In general, the routines executed to implement the embodiments of the invention, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts and/or sequence diagrams.

The terminology used herein is for the purpose of describing particular embodiments only and is not intended to be limiting of the embodiments of the invention. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. In general, embodiments of the invention rely upon providing technical arrangements whereby automated evaluation and deployment of machine learning models for anomaly detection is based upon training and cross-validation of provided candidate algorithms by sampling benchmarking datasets constructed from provided pools of 'negative' and 'positive' data samples, and computing mean average precision (MAP) as a metric of algorithm performance. The candidate models may thereby be compared or ranked, and a preferred algorithm selected for deployment.

Accordingly, the described embodiments should be understood as being provided by way of example, for the purpose of teaching the general features and principles of the invention, but should not be understood as limiting the scope of the invention.

What is claimed is:

1. A computer-implemented method of evaluating and deploying machine learning models for anomaly detection of a monitored system, wherein the monitored system is one of a database system, a transaction processing system, an information system, a web service provider system, an industrial system, a security system, or a robotics system, the method being performed by an evaluation system, and the method comprising:

accessing a plurality of candidate machine learning algorithms configured for anomaly detection of the monitored system, wherein the candidate machine learning algorithms are configured to present a common interface to an evaluation processing unit of the evaluation system;

accessing training data including a pool of negative data samples representing normal activity of the monitored system and one or more smaller pools of positive data samples, wherein each pool of positive data samples represents one type of anomalous activity of the monitored system, and the types of anomalous activity depend upon the nature of the monitored system and represent erroneous, inconsistent or corrupted database records, fraudulent transactions, attempted or actual attacks or security breaches, system errors or performance degradation, or impending or actual equipment failures;

for each type of anomalous activity, generating a benchmarking dataset which comprises a first number of samples drawn from the pool of negative samples, and a second number of samples drawn from the pool of positive samples corresponding with the type of anomalous activity, wherein the first number of samples is substantially larger than the second number of samples;

for each combination of a candidate machine learning algorithm selected from the plurality of candidate machine learning algorithms with a type of anomalous activity:

drawing a plurality of training and cross-validation sets from the benchmarking dataset corresponding with the type of anomalous activity, wherein each training set comprises only negative data samples, and each cross-validation set comprises a mix of negative and positive data samples, for each one of the plurality of training and cross-validation sets, training a machine-learning model based on the candidate algorithm using the training set, and validating the machine-learning model using the cross-validation set with average precision as a performance metric, and computing a mean average precision value for the candidate machine learning algorithm across the average precision performance metrics obtained using the plurality of training and cross-validation sets;

for each candidate machine learning algorithm, computing a ranking value based upon at least the mean average precision values computed for the candidate machine learning algorithm for each type of anomalous activity;

selecting a machine learning algorithm from the candidate machine learning algorithms based upon the computed ranking values; and deploying a machine learning model based on the selected algorithm to a monitoring system, whereby the monitoring system executes the deployed machine learning model to detect anomalies of the monitored system.

2. The computer-implemented method of claim 1 wherein, for all of the benchmarking datasets, a ratio of the first number of samples to the second number of samples comprises a single fixed value.

3. The computer-implemented method of claim 1 wherein the ranking values are computed in accordance with a rank aggregation algorithm.

4. The computer-implemented method of claim 3 wherein the rank aggregation algorithm employs a Spearman's footrule distance measure.

5. The computer-implemented method of claim 3 wherein the rank aggregation algorithm is a weighted rank aggregation algorithm wherein a set of selectable importance values represents relative importance of each type of anomalous activity.

6. An anomaly detection system comprising:

a monitoring subsystem;

a monitoring subsystem, wherein the monitored subsystem is one of a database system, a transaction processing system, an information system, a web service provider system, an industrial system, a security system, or a robotics system; and an evaluation subsystem configured to access a plurality of candidate machine learning algorithms configured for anomaly detection of the monitored system, wherein the candidate machine learning algorithms are configured to present a common interface to an evaluation processing unit of the evaluation system, and training data including a pool of negative data samples representing normal activity of the monitored system and one or more smaller pools of positive data samples, wherein each pool of positive data samples represents one type of anomalous activity of the monitored system, and the types of anomalous activity depend upon the nature of the monitored system and represent erroneous, inconsistent or corrupted database records, fraudulent transactions, attempted or actual attacks or security breaches, system errors or performance degradation, or impending or actual equipment failures, wherein the evaluation subsystem is further configured to:

for each type of anomalous activity, generate a benchmarking dataset which comprises a first number of samples drawn from the pool of negative samples, and a second number of samples drawn from the pool of positive samples corresponding with the type of anomalous activity, wherein the first number of samples is substantially larger than the second number of samples;

for each combination of a candidate machine learning algorithm selected from the plurality of candidate machine learning algorithms with a type of anomalous activity:

draw a plurality of training and cross-validation sets from the benchmarking dataset corresponding with the type of anomalous activity, wherein each training set comprises only negative data samples, and each cross-validation set comprises a mix of negative and positive data samples, for each one of the plurality of training and cross-validation sets, train a machine-learning model based on the candidate algorithm using the training set, and validate the machine-learning model using the cross-validation set with average precision as a performance metric, and compute a mean average precision value for the candidate machine learning algorithm across the average precision performance metrics obtained using the plurality of training and cross-validation sets;

for each candidate machine learning algorithm, compute a ranking value based upon at least the mean average precision values computed for the candidate machine learning algorithm for each type of anomalous activity; and select a machine learning algorithm from the candidate machine learning algorithms based upon the computed ranking values, wherein a machine learning model based on the selected algorithm is deployed to the monitoring subsystem, which is configured to execute the deployed machine learning model to detect anomalies of the monitored subsystem.

7. The anomaly detection system of claim 6 wherein, for all of the benchmarking datasets, a ratio of the first number of samples to the second number of samples comprises a single fixed value.

8. The anomaly detection system of claim 6 wherein the ranking values are computed in accordance with a rank aggregation algorithm.

9. The anomaly detection system of claim 8 wherein the rank aggregation algorithm employs a Spearman's footrule distance measure.

10. The anomaly detection system of claim 8 wherein the rank aggregation algorithm is a weighted rank aggregation algorithm wherein a set of selectable importance values represents relative importance of each type of anomalous activity.

* * * * *